United States Patent [19]

Golden et al.

[11] 4,264,742

[45] Apr. 28, 1981

[54] OPACIFYING AGENTS AND PROCESS FOR PRODUCTION

[75] Inventors: Ronald Golden, Mt. Prospect, Ill.; Mabrin P. Powell, Mason, Ohio

[73] Assignee: Champion International Corporation, Stamford, Conn.

[21] Appl. No.: 40,501

[22] Filed: May 21, 1979

Related U.S. Application Data

[63] Continuation of Ser. No. 924,664, Jul. 14, 1978, abandoned, which is a continuation of Ser. No. 808,602, Jun. 21, 1977, abandoned.

[51] Int. Cl.$^3$ .............................................. C08J 9/28
[52] U.S. Cl. ...................................... 521/64; 521/63; 521/65; 521/136; 521/187; 521/188
[58] Field of Search ............................ 521/63, 64, 136

[56] References Cited

U.S. PATENT DOCUMENTS

| | | | |
|---|---|---|---|
| 3,585,149 | 6/1971 | Vassiliodes et al. | 260/2.5 F |
| 3,669,899 | 6/1972 | Vassiliodes et al. | 260/2.5 F |
| 3,779,957 | 12/1973 | Vassiliodes et al. | 260/2.5 F |
| 3,781,230 | 12/1973 | Vassiliodes et al. | 260/2.5 B |
| 3,928,272 | 12/1975 | Brancato et al. | 260/851 |

*Primary Examiner*—Morton Foelak
*Attorney, Agent, or Firm*—Evelyn M. Sommer

[57] ABSTRACT

Opacifying agents of improved structural integrity and light scattering ability are disclosed. These agents are composed of hollow, substantially spherical agglomerates having discontinuous walls composed of solid, spherical microparticles. The microparticles are produced by admixing an aqueous, partially condensed aldehyde condensation product with an oily non-solvent material and an emulsifying agent to produce a water-in-oil emulsion. Polymerization acid catalyst is then admixed with the emulsion to produce the discrete, substantially spherical and opaque, solid microparticles. After inverting the emulsion to oil-in-water form and adding oil-soluble resin adhesive, elevated temperature is used to cure the adhesive while evaporatively removing residual oily non-solvent. This yields improved agglomerate opacifying agents of high physical stability.

12 Claims, No Drawings

OPACIFYING AGENTS AND PROCESS FOR PRODUCTION

This application is a continuation of Ser. No. 924,664, filed July 14, 1978, now abandoned which in turn was a continuation of Ser. No. 808,602, filed June 21, 1977, both of these applications now being abandoned.

BACKGROUND OF THE INVENTION

The production of spherical, solid microspheres of carbamide-aldehyde condensation products having diameters within the range of from about 0.5 to 5 microns for use as opacifying agents is known in the art. Suitable methods of production are, for example, disclosed in U.S. Pat. No. 3,928,272 of Brancato et al and in U.S. Application Ser. No. 508,322 of David N. Vincent et al.

These microspheres may be produced from an aqueous solution of partially condensed aldehye condensation product, such as urea-formaldehyde, oily non-solvent for the condensation product and surface-active emulsifying agent. After their high-shear admixture to produce a water-in-oil emulsion, an acid catalyst is added to polymerize the condensation product into substantially spherical, opaque and solid microparticles.

As is also disclosed in the aforementioned application of Vincent et al, it has been discovered that these microparticles may be agglomerated to yield agents of improved opacifying power. This may be accomplished by converting the microparticle medium from a water-in-oil to an oil-in-water emulsion and then providing conditions of high-shear agitation and heating effective to remove the residual oily material and bond the microspheres into spherical agglomerates. These agglomerates are believed to be produced by post-curing and fusion of the initial, polymerized particles after their inversion in form from water-in-oil to oil-in-water emulsion droplets.

These secondary or agglomerate particles are irregular and bumpy, being a spherical shell of the initial or primary polymer microparticles. In contrast to the smooth microparticle precursors having average diameters of between about 0.5 to 5 microns, these agglomerates possess average particle diameters between about 1 to 20 microns, preferably between about 2 to 7 microns and exhibit, by virtue of their pebbled surface, a raspberry-like appearance. These agglomerates are hollow instead of solid.

The most unique characteristic of these agglomerates is that they exhibit an unexpected two to three fold increase in their light scattering abilities as compared to the individual, initial microparticles of which they are composed. This increase in light scattering ability constitutes a substantial advantage in their use as opacifying agents for such diverse environments as paints, paper, plastic, fabric, textile webs and the like to which they may be added in conventional manner.

INTRODUCTION TO THE INVENTION

Agglomerate opacifying agents composed of solid polymer particles and produced by, for example, the procedure set forth in U.S. Application Ser. No. 508,322 of Vincent et al (the disclosure of which is incorporated herein as if it were set forth at length in order more fully to describe this aspect of the invention) have provided substantial advantages in the conventional uses of the art. It has been discovered, however, that known techniques for the production of such agglomerates suffer from a variety of drawbacks. Most particularly, agglomerates thus far produced require careful control over their processes of production in order to insure adequate degrees of bonding between the initial microparticles of which they are composed. Additionally, the presence of certain contaminates should be avoided in order to insure adequate agglomeration. Finally, even under optimum conditions, the structural integrity of the agglomerates may be limited and the subsequent breakdown of these agglomerates may result in loss of some of their improved light scattering ability.

In view of the foregoing, it is an object of this invention to provide an improved means for the production of agglomerated opacifying agents composed of solid, polymer microparticles.

It is a further object of this invention to produce agglomerated opacifying agents of improved structural integrity so as to insure high light scattering coefficients.

These, as well as other advantages as are set forth in the description which follows, are achieved through the present invention.

DESCRIPTION OF THE INVENTION

Polymeric microparticles useful for forming agglomerated opacifying agents may be produced by high shear admixture of an aqueous solution of a prepolymer comprising a carbamide-aldehyde condensation product, an oily non-solvent material and an emulsifying agent. A water-in-oil emulsion is thereby formed, the prepolymer being distributed within aqueous droplets of a size conforming with that of the solid particles to be formed. An acid catalyst is then admixed with the water-in-oil emulsion to permit further polymerization of the prepolymer. This polymerization, which ordinarily occurs under mild agitation and temperatures, rapidly produces the individual and solid polymer microparticles.

Any partially condensed carbamide-aldehyde is suitable for employment in the production of these microparticles. Preferably, however, the carbamide-aldehyde prepolymer is a urea-formaldehyde condensation product having a formaldehyde to urea mole ratio in a range of between about 1:1 to 2.5:1, most preferably between about 1.2:1 and 1.5:1. Such a urea-formaldehyde condensation product or prepolymer may be produced by heating an aqueous solution of urea-formaldehyde having about 50% solids and a pH of about 9 to 10 to a temperature between about 50° and 120° C. The degree of reaction may simply be controlled by the time of exposure to these conditions so as to result in a substantially clear, prepolymer solution. When the reaction has reached the desired degree of completion, the reaction mixture may simply be cooled to, for example, room or ambient temperature to stop further polymerization.

In addition to the carbamide and aldehydic ingredients, other constituents, for example, acid or base catalyzed coreactants, may be added to the reaction medium in producing the individual, solid microparticles. Thus, for example, the reaction medium may include phenols such as hydroxybenzene, m-cresol and 3,5-xylenol; carbamides such as urea; triazines such as melamine; amino and amido compounds such as aniline, p-toluenesulfonamide, ethyleneurea and guanidine; ketones such as acetone and cyclohexanone; or combination of these materials. It is necessary only that the resultant prepolymers remain soluble in water and essentially insoluble in the water-immiscible phase to be utilized in the production of the individual, solid microparticles.

The nature of the oily non-solvent utilized in production of the emulsions is likewise non-critical. Suitable water-immiscible oily materials include, for example, any organic capable as acting as the continuous phase of a water-in-oil emulsion. Exemplary materials include aliphatic and aromatic solvents such as petroleum ethers, naphthas, mineral spirits, toluene, xylene, turpentine or the like. Similarly, ketones, esters, halogenated hydrocarbons, etc. may be utilized in this process. The preferred non-solvents, however, are those having relatively low cost and low toxicity such as mineral spirits or xylene.

The emulsifying agent or surfactant utilized in this process may be selected from among those capable of promoting the formation of water-in-oil emulsions. Such materials are well known and include, for example, lanolin, lanolin derivatives, sorbitan monooleate, polyol oleates, ethyleneoxide adducts of fatty acids, fatty alcohols, fatty amines and fatty amides, cholesterol derivatives, fatty acid diethanol-amines, ethyleneoxide-propyleneoxide block copolymer condensation products and the like. Preferred emulsifying or surfactant agents are the ethyleneoxide-propyleneoxide block copolymeric condensation products commercially available from BASF-Wyandotte Corporation under the names "Pluronic" and "Tetronic".

These agents are normally present in an amount sufficient to provide, for example, between about 0.005 and about 3.0 parts by weight of emulsifying agent per part of oily non-solvent. More preferably, amounts of between about 0.02 and about 0.08 parts by weight of oily material are utilized.

In forming the water-in-oil emulsion, it is preferred that the aqueous (or internal) phase be present within the range of between about 0.4 and 3 parts by weight, most preferably between about 1 to 2 parts by weight, per part by weight of the oily (or external) phase. Although it is possible to use a higher ratio of aqueous to oily phase, a 2:1 ratio has provided optimum results. The viscosity of the emulsion is preferably low and water-like.

The water-in-oil emulsion may be prepared batchwise utilizing a tank with high shear agitation, or continuously by combining the oil and water phases in an in-line mixer such as a Homomixer or Sonulator. The degree of agitation is preferably such that the emulsion droplets will have an average particle diameter below about 5 microns, preferably in the range of between about 0.5 to 2 microns. This insures polymer microparticles of the most desirable sizes.

The acid polymerization catalyst added to the water-in-oil emulsion to produce the individual solid polymer particles may again be selected from those known in the art for this purpose. These polymerization catalysts are desirably soluble in the continuous oily phase while still having a significant affinity for the internal or water phase. Thus a distribution coefficient between the two immisicle liquids is preferred although not—as may be seen from the exemplary listing below—necessary. Accordingly, they may for example, be selected from among $SO_2$, $SO_3$, $BF_3$ $BF_3$ etherate, titanium tetrachloride, phosphoric acid, phosphouous pentachloride, silicontetrachloride, phosphorous trichloride, sulfuryl chloride, and the like. Alternatively, organic carboxylic acids such as formic acid, acetic acid, trichloroacetic acid, and the like; alkyl acid phosphates, such as monoethyl acid phosphate, monoamyl acid phosphate, monobutyl acid phosphate, diethyl acid phosphate and the like; or substituted sulfamic acids may be utilized. Ordinarily these polymerization catalysts have an ionization constant greater than about $10^{-4}$. They are preferably employed in an amount sufficient to lower the pH of the prepolymer phase to a pH betw-en about 0.5 and about 4, preferably to between about 1 and 2.

The catalyst is normally added to an emulsion at ambient temperatures and under mild agitation. Because the polymerization reaction is exothermic, an increase in the temperature of the emulsion admixture will result. Accordingly, the emulsion, which ordinarily has an initial temperature within the range of between about 10° and 25° C., will rapidly increase to within the range of about 30° to 70° C. To facilitate control over the polymerization reaction, cooling means are ordinarily utilized. In this manner, the maximum temperature of polymerization may be retained within the preferred range of about 40° to about 50° C. The reaction itself is ordinarily conducted for between about 0.25 and about 4 hours, preferably for about 0.5 hour.

Polymerization of the prepolymer results in the formation of a dispersion of microparticles and water droplets in the water-immiscible oily material. In order to convert this emulsion-dispersion to a form suitable for the agglomeration step, it is necessary to invert the emulsion to one which is oil-in-water.

Inversion may be performed simply by, for example, separating a substantially clear supernatant phase comprising the oily non-solvent, e.g. xylene, and most of the emulsifying agent. This leaves a remaining, heavy phase comprising residual non-solvent, water and the solid polymer particles. Alternatively, heating the solvent dispersion to evaporate oily non-solvent within the range of between about 35° and about 70° C., preferably between about 40° and about 50° C. will produce the desired oil-in-water form. It is also possible to add water to water-in-oil emulsion in lieu, or in supplementation, of removal of oily non-solvent.

At least a small amount of the non-solvent, e.g. xylene, is maintained in the inverted emulsion containing the solid polymer particles. Suitable amounts of such non-solvent are between about 0.2 and about 2, preferably between about 0.5 and about 1, parts by weight of non-solvent per part of polymer solids. This places the solid polymer particles in a condition suitable for agglomeration into a configuration which exhibits improved opacifying qualities.

To the oil-in-water emulsion is now added an oil-soluble resin adhesive. This adhesive is normally provided in an amount of from about 0.002 to 5.0 parts by weight of resin solid of microparticles per part. Exemplary adhesives include urea and melamine resins, acrylic, epoxy, phenolic, vinyl and cellulosic resins and the like.

The resultant admixture is then subjected to further agitation and to elevated temperatures sufficient to cure the adhesive into solid, non-tacky form. This may, for example, be performed by subjecting the dispersion to live steam or by indirect heating using conventional heating means to provide a temperature in the range of between about 120° and about 260° F., preferably between about 190° and about 212° F., while employing high shear mixing for a period of about 30 minutes. Under these conditions, residual oily non-solvent is removed by steam distillation.

As non-solvent is removed, the polymeric microparticles are rapidly transformed into agglomerated structure. It is unnecessary, however, to retain these conditions for a period of time sufficient to remove all of the residual oily non-solvent. Once the desired degree of agglomeration has been achieved, the temperatues may be lowered and, if desired, remaining oily non-solvent removed under vacuum conditions without impairment of the stability or opacifying power of the final product.

It is believed that agglomeration results from a combination of simultaneous changes. As non-solvent is evaporated from the initial oily droplets containing the microspheres, the adhesive in the non-solvent deposits onto the agglomerates forming at the droplet-water interface. Further, under the acidic, heated conditions of non-solvent evaporation, some further polymerization may occur between contingent microsphere surfaces.

The product, agglomerated opacifying agents are—like those of the prior art formed without the use of oil soluble resin adhesives—essentially hollow and composed of a spherical wall of the precursor solid microparticles. They are thus pebbled or raspberry-like in appearance and have average particle diameters of between about 1 to 20 microns, most preferably between about 2 to 7 microns. In addition to having an opacity which is up to 300 to 400 or more percent of that of the solid polymeric particles of which they are composed, they exhibit a structural integrity of significantly enhanced degree, dependent essentially upon the amount of oil soluble resin adhesive they contain.

After agglomeration is complete, the water is normally removed from the resultant aqueous-dispersion of these particles and they may be dried to a powder-like form. This facilitates storage and/or control upon subsequent incorporation into paint or the like for eventual use.

In an optional step, however, it is desirable to neutralize the agglomerates prior to drying. This may be performed by addition of any suitable base. Moreover, it has been found that adjustment to a pH of greater than about 8, normally between about 8 and 10, facilitates production of a powder which is free-flowing and non-caking.

The agglomerates may also be washed either before or after drying. This step, which may be performed with water, removes traces of surfactant-emulsifier, etc. Thus it may both insure a purer product and serve partially to neutralize the agglomerates.

The following examples illustrate the production of the agglomerated opacifying agents of the present invention an evidence preferred modes contemplated for carrying out the present invention. In these, as in all parts of the specification proportions and parts are on a weight basis unless otherwise specified. Additionally, by comparison, they show various of the advantages of this invention.

EXAMPLE 1

165 grams of 37% formaldehyde and 45 grams of water were combined and brought to a pH of 9.3 through addition of 10% sodium hydroxide. To this solution were added 89.5 grams of urea and 0.5 grams of melamine. The resultant solution was then heated for one hour at 65° C. to produce a urea-formaldehyde prepolymer solution.

140 grams of the prepolymer solution were combined with a solution of 6 grams of polyethylene oxide-propylene oxide block copolymer (Pluronic P123, BASF-Wyandotte) in 100 grams of xylene. The resultant composition was admixed in a Waring blender to produce a water-in-oil emulsion.

A dilute xylene solution containing 50 milliequivalents of sulfur dioxide was added to the emulsion under high shear agitation. This initiated an exothermic polymerization action which was permitted to continue for one hour to product discrete, substantially spherical microparticles of solid resin averaging about 1.0 microns in diameter.

2.1 grams of a 50% solution of acrylic thermoplastic resin in xylene (Acryloid B-66-X, Rohm and Hass) and 100 grams of water were then added to 200 grams of the microparticle-containing emulsion. The resultant mixture was steam distilled under high shear agitation to yield a xylene-free aqueous dispersion of hollow, agglomerated opacifying agent. The solid agglomerates were washed with water to remove residual surfactant.

The aqueous slurry of agglomerates containing 100 dry parts by weight of resin solids was then adjusted to a pH of 9 with ammonia. To this slurry was then added 10 dry parts by weight of carboxylated styrene butadiene latex adhesive (Dow 620). The resultant coating material was then coated on paper at three different coat weights. The coated paper gave an average Kubelka Munk light scattering coefficient of 4178 $cm^2/g$. The hollow agglomerates containing supplementary resin adhesive showed a particularly high degree of structural stability.

EXAMPLE 2

Urea-formaldehyde prepolymer solution prepared in accordance with the process of Example 1 was treated to produce substantially spherical microparticles of solid resin having an average diameter of about 0.8 microns. This was done by adding 140 grams of the prepolymer solution to 6 grams of polyethylene oxide-polypropylene oxide block copolymer ((Tetronic 1502, BASF-Wyandotte) dissolved in 100 grams of xylene; subjecting the resultant admixture to high shear in a Waring blender to produce a water-in-oil emulsion and adding 12 milliliters of 5.1 N sulfur dioxide solution in xylene to the emulsion to polymerize the prepolymer.

A first portion of 720 grams of the emulsion containing spherical microparticles of solid resin was treated to form agglomerates. 18 grams of a 50% solid solution of butylated melamine-formaldehyde resin in isobutanol (Resinene 879, Monsanto) were added to the emulsion, which was then subjected to steam distillation for removal of xylene in the manner set forth in Example 1. Hollow spherical agglomerates were produced. These agglomerates were then washed with water to remove residual surfactant. Paper was coated with an admixture of latex and agglomerates as described in Example 1.

In addition to the foregoing, some of the agglomerates were first dispersed as a 17% aqueous slurry and agitated at 6,000 rpm in a Waring blender before being admixed with latex and coated onto paper. These additional steps provided a means of assessing their resistance to physical breakdown.

The first sample—i.e. that coated directly onto paper—showed substantially no breakdown of the agglomerates into wall fragments or the like. Analysis for an average Kubelka Munk scatter coefficient revealed a value of 4047 $cm^2/g$. With the sample subjected to additional high shear agitation before coating, the agglomerates still retained their integrity. Moreover, the scatter coefficient of this coating material was unexpectedly increased to 4341 cm²/g.

For comparative purposes, these two sample runs were repeated, but in the absence of stabilizing adhesive additives during agglomeration. The agglomerate composition coated directly onto paper had a Kubelka Munk scatter coefficient of 4035 cm²/g and little breakdown. That subjected to preliminary agitation, however, was reduced to 3402 cm²/g and contained many wall fragments and even individual polymer microparticles.

From the foregoing, it may be seen that the absence of adhesive during production of agglomerates from the initial spherical particles of solid resin results in a relatively fragile opacifying agent subject to substantial loss of its light scattering characteristics. In contrast, however, the presence of as little as five parts by weight of adhesive not only provides increased resistance to breakdown, but may increase light scattering ability.

What is claimed is:

1. In a process for producing improved opacifying agents comprising forming solid, spherical microparticles of carbamide-aldehyde polymer from a carbamide-aldehyde prepolymer in a water-in-oil emulsion of non-solvent, said carbamide-aldehyde prepolymer being soluble in the water phase and essentially insoluble in the oil phase, inverting said emulsion to oil-in-water form and subjecting said oil-in-water emulsion to an elevated temperature sufficient to evaporatively remove oily non-solvent and produce hollow, substantially spherical agglomerates having discontinuous walls composed of solid, spherical microparticles, the improvement which consists essentially of conducting said evaporation so that at least a small amount of non-solvent is maintained in the emulsion, incorporating into the oil-in-water emulsion from about 0.002 to about 5.0 parts of an oil-soluble melamine-formaldehyde resin adhesive per part of said solid microparticle into said emulsion, subjecting the resulting admixture to an elevated temperature while agitating whereby said solid, spherical microparticles are agglomerated to form hollow, substantially spherical agglomerates having discontinuous walls composed of said solid, spherical microparticles, said agglomerates having an average particle diameter of between about 1 to 20 microns and an opacity up to about 400 percent over that of the solid polymeric particles of which they are composed.

2. The process of claim 1, wherein the carbamide-aldehyde polymer comprises urea-formaldehyde in a mole ratio of between about 1:1 to 2.5:1.

3. The process of claim 1, wherein the water-in-oil emulsion contains between about 0.005 and about 3.0 parts of emulsifying agent per part of non-solvent and the product agglomerates are washed with water to remove residual emulsifying agent.

4. The process of claim 1, wherein the water-in-oil emulsion has between about 0.4 to 3 parts of aqueous phase per part of oily phase prior to polymerization of microparticles.

5. The process of claim 1, wherein the agglomerates are neutralized to a pH of at least 8.

6. The process of claim 1, wherein organic pigment is incorporated into the microparticles.

7. The agglomerates produced by the process of claim 1.

8. The agglomerates produced by the process of claim 2.

9. The agglomerates produced by the process of claim 6.

10. The process of claim 1, wherein the oil-in-water emulsion contains 0.2 to 2 parts non-solvent per part of polymer particles.

11. The process of claim 10, wherein the oil-in-water emulsion contains 0.5 to 1 part non-solvent per part of polymer particles.

12. The process of claim 1 wherein the oil-soluble melamine-formaldehyde resin adhesive is a butylated melamine-formaldehyde resin adhesive.

* * * * *